United States Patent [19]
Meiners

[11] 3,817,354
[45] June 18, 1974

[54] OIL PAN FOR TRACTORS
[75] Inventor: Elmo R. Meiners, Anchor, Ill.
[73] Assignee: M & W Gear Company, Gibson City, Ill.
[22] Filed: June 1, 1972
[21] Appl. No.: 258,512

[52] U.S. Cl. .............................. 184/104 B, 165/164
[51] Int. Cl. ............................................. F01m 5/00
[58] Field of Search ................ 184/104 B, 6.5, 106; 165/164, 179; 123/198 E; 180/69.1

[56] References Cited
UNITED STATES PATENTS

| | | | |
|---|---|---|---|
| 1,365,438 | 1/1921 | Adamson | 184/104 B |
| 1,561,898 | 11/1925 | Antisell | 165/164 X |
| 1,737,394 | 11/1929 | Sunday | 165/179 |
| 2,577,188 | 12/1951 | Hall | 184/104 B |
| 3,688,871 | 9/1972 | Krestan et al. | 184/6.5 |

Primary Examiner—Manuel A. Antonakas
Attorney, Agent, or Firm—Molinare, Allegretti, Newitt & Witcoff

[57] ABSTRACT

A cast aluminum oil pan having an increased volume and including external fins and internal projections is provided for a tractor.

3 Claims, 5 Drawing Figures

OIL PAN FOR TRACTORS

BACKGROUND OF THE INVENTION

This invention relates to an improved oil pan for use with an engine on a tractor or the like.

Typically, the original equipment oil pan utilized on the engine of a tractor is made from cast iron. This original equipment oil pan will generally hold from eight to thirteen quarts of oil. The oil from the pan is circulated over the crank shaft and similar moving parts of the reciprocating gasoline engine of the tractor to lubricate the moving parts. However, because the original equipment oil pan generally holds only a limited amount of oil, the lubricating oil will be heated and must lubricate the moving parts at rather high temperatures.

These high temperatures often are above the "break down" point, i.e., the point at which the oil loses some of its lubricating qualities because of a chemical change in structure. As a result, damage may occur such as scored pistons or ring damage. Also, more heat will build up throughout the engine. Ultimately, this will result in additional maintenance and replacement of parts. The present invention seeks to overcome these difficulties encountered with prior art oil pans and oil systems, particularly for tractors.

SUMMARY OF THE INVENTION

In a principal aspect, the present invention comprises an improved oil pan fabricated from cast aluminum. The oil pan includes an array of external fins to help dissipate heat. In addition, internal projections extend upwardly into the pan in order to conduct heat from the oil on the interior of the pan. The capacity of the oil pan is greatly increased in order to maintain the operating temperature of the lubricating oil at a desired level.

It is thus an object of the present invention to provide an improved oil pan for tractors and the like.

It is a further object of the present invention to provide an improved oil pan which includes external heat dissipating fins.

Still another object of the present invention is to provide an improved oil pan which includes internal projections which are adapted to conduct heat from the interior of the oil pan and thus maintain the oil temperature below a critical maximum.

These and other objects, advantages and features of the present invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
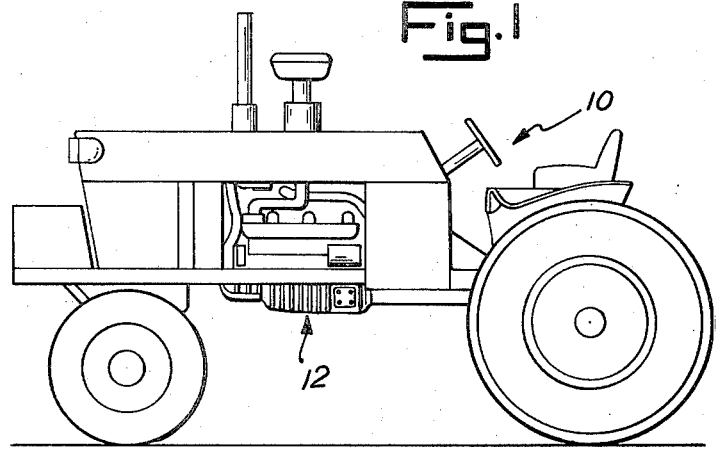
FIG. 1 is a side elevation of a typical tractor which includes the improved oil pan of the present invention.

A tractor 10 is illustrated in FIG. 1 with the improved oil pan 12 attached to the engine block of the tractor 10. The oil pan 12 is attached to the engine block in the conventional manner well known to those skilled in the art. The shape of a seal (not shown) between the oil pan 12 and the engine block is the same as the seal for the factory made original equipment oil pan (not shown).

The original equipment oil pan in such a tractor is typically made from cast iron and typically has a capacity of from eight to thirteen quarts of oil. The oil pan of the present invention provides about twice as much capacity as the original equipment oil pan by providing greater length in the oil pan 12. Thus, the oil pan of the present invention will have a capacity of, for example, twenty quarts. Also, because the depth of the pan is the same as the original equipment, the original dip stick can be used to determine oil level.

FIGS. 2 through 5 illustrate the specific construction of the oil pan of the present invention. The oil pan includes an upper circumferential sealing surface 14. The shape of the sealing surface 14 and the number and position of bolt attachment openings 16 are the same as in the original equipment oil pan. The openings 16 are, of course, for the purpose of fitting bolts therethrough to attach the oil pan 12 to the engine block of the tractor 10. Openings 17 are also provided in the flange end or planar end of the pan 12 for attachment of the pan 12 to the engine block.

The oil pan 12 is fabricated from cast aluminum and comprises a shell for enclosing a volume in which the lubricating oil may circulate. A bottom wall 18 and side walls 20, 22, 24 and 26 define the shell which is the oil pan 12.

Figure 3:
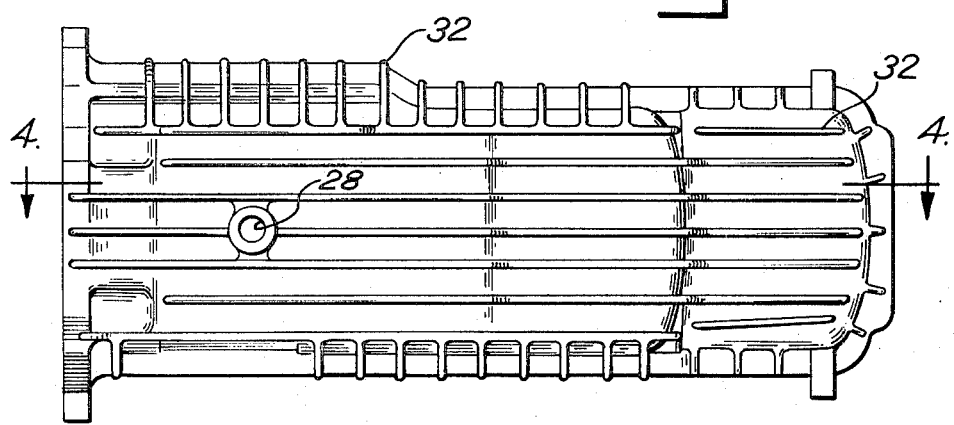
FIG. 3 is a bottom plan view of the improved oil pan of the present invention.
Figure 4:
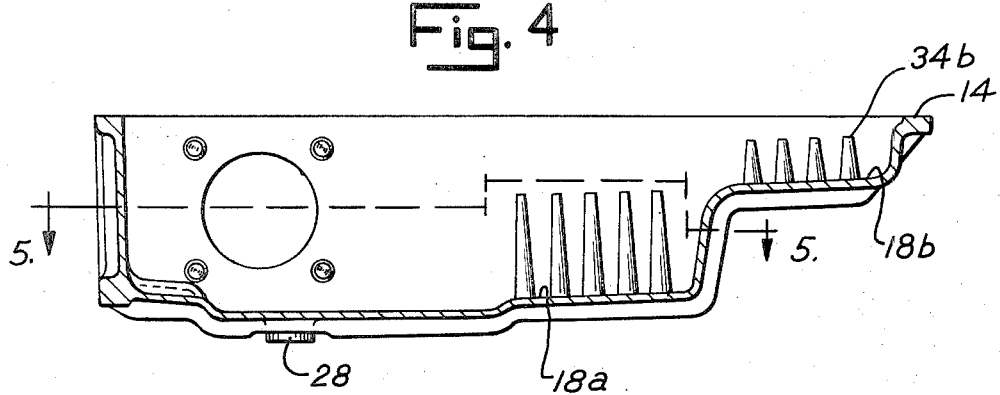
FIG. 4 is a side cross-sectional view of the oil pan taken substantially along the line 4—4 in FIG. 3.
Figure 5:
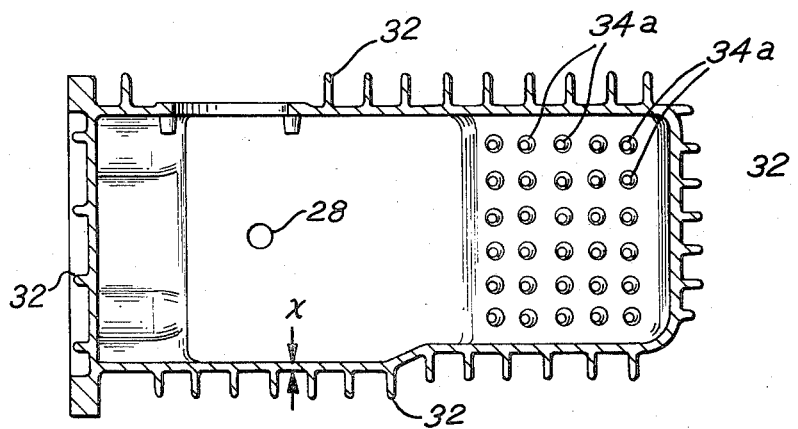
FIG. 5 is a cross-sectional plan view of the oil pan taken substantially along the line 5—5 in FIG. 4.

As illustrated in FIGS. 3, 4 and 5, a drain plug 28 is provided in the lowest part of the bottom wall 18. An opening 30 is also provided through side wall 20. A plate may be attached over the opening 30 to enclose the pan 12. Removal of the plate 30 permits visual inspection of the interior of the oil pan 12 and changing of the filter associated with the pan 12.

A plurality of fins 32 are defined on the outside surface of the walls 18, 20, 22, 24, 26 of the oil pan 12. The fins 32 are integrally cast as part of the oil pan 12 and extend outwardly for a distance of at least one times the thickness of the walls 18, 20, 22, 24, 26 of the oil pan up to a distance of five or six times the thickness of the walls 18, 20, 22, 24, 26 of the oil pan 12. Thus, typically, where the wall of the oil pan is three-eighths to one-half inch thick as at the dimension $x$ in FIG. 5, the fins 32 extend outwardly from the walls 18, 20, 22, 24, 26 at least ⅜ and perhaps up to 2½ inches from the outside surface of the walls 18, 20, 22, 24, 26.

The fins 32 may be arranged in any desired fashion to facilitate the ease of the casting process. Preferably, the thickness of the fins 32 is equal to the thickness of the walls 18, 20, 22, 24, 26, in other words, the dimension $x$. Again, preferably, the fins 32 are spaced from one another by a distance approximately four to six times the thickness of a fin 32, that is, 4 to 6×.

Figure 2:
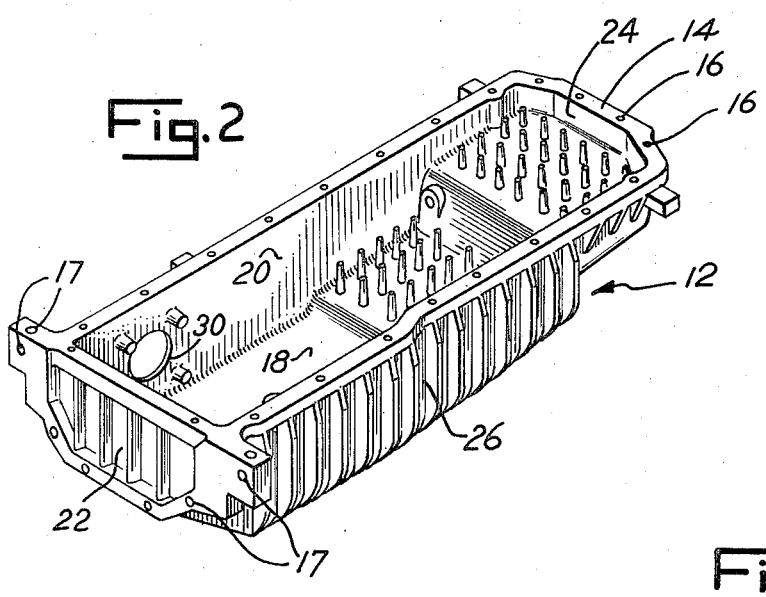
FIG. 2 is a perspective view of the improved oil pan of the present invention.

In addition to the external fins 32, the oil pan 12 includes a plurality of internal projections 34. The projections in the embodiment shown preferably extend upward from the interior surface of the bottom wall 18 into the interior of the shell defining the oil pan 12. As shown in FIGS. 2, 4 and 5, the projections 34 are frusto-conical in shape and have a base diameter perhaps two times the thickness of the wall of the oil pan, that is 2× at the base. Projections 34 are tapered and terminate with a top portion thickness approximately equal to the wall thickness of the oil pan 12, that is $x$.

In the embodiment shown, there are two sets of projections 34. The first set of projections 34a are defined or positioned on a first level of bottom wall 18a and the second set of projections 34b are defined on a second level of bottom wall 18b. The particular arrangement and elevation of the various portions of the bottom wall 18 is, of course, a matter of choice depending upon casting considerations and the total volume desired for the oil pan 12. In any event, the projections 34a extend upwardly from the bottom surface 18a into the interior of the oil pan 12 for a distance greater than half the depth of the oil pan 12. Similarly, the projections 34b extend for a distance greater than half the distance from the bottom surface 18b toward the plane of the sealing surface 14.

The precise placement, position and arrangement of the projections 34 are also a matter of choice. As illustrated in FIG. 5, the projections 34a are arranged in a rectangular matrix at the intersections of two groups of parallel lines that intersect at right angles. The projections 34a are spaced from one another approximately the distance of twice the base dimension of the projections 34a or 2×. Again, it is emphasized that the arrangement of the projections, their particular shape and the placement of the projections on the side or bottom walls is a matter of choice depending, in large measure, upon the casting operation.

With the oil pan of the present invention made from cast aluminum heat transfers from the oil four to five times faster than with the prior art cast iron pan. Also, it has been found that the construction keeps the operating temperature of the oil at least 30°F. lower than was previously possible with the original cast iron equipment.

Heat is conducted from the oil on the interior of the pan by the projections 34 through to the surface of the pan there to be dissipated by the outer surface and the fins 32. The projections 34 also assist to agitate and stir the oil so that the transfer of heat is made more effective. In this manner and because of the extension of the projections 34 into the interior of the pan, heat is transferred from substantially all of the oil in the pan. This avoids hot zones of oil and promotes complete and free circulation of the oil.

All embodiments which are to be considered within the spirit and scope of the invention are defined and limited only by the following claims and their equivalents.

What is claimed is:

1. An improved oil pan comprising, in combination:

a cast aluminum half shell forming said pan,
said shell including an upper circumferential sealing surface for sealing engagement with an engine block when said pan is attached to said engine block, said pan including a deep dished portion having a bottom surface, said shell including a plurality of external separated fins integrally cast as part of said shell and extending outwardly therefrom to transfer heat to the surrounding atmosphere, and said shell including an array of integrally cast, frusto-conical projections extending upwardly from said bottom surface into the interior of said shell at least one half the depth of the oil pan, said projections being provided to conduct heat from oil at the interior of said pan to said shell and said external fins to agitate oil flowing over said projections and to permit substantially unchanneled flow of oil through said pan.

2. An improved oil pan comprising, in combination:

a cast aluminum half shell forming said pan,
said shell including an upper circumferential sealing surface for sealing engagement with an engine block when said pan is attached to said engine block, said pan including a deep dished portion having a bottom surface, said shell including a plurality of external separated fins integrally cast as part of said shell and extending outwardly therefrom to transfer heat to the surrounding atmosphere, and said shell including an array of integrally cast, frusto-conical projections extending upwardly from said bottom surface into the interior of said shell, adjacent projections being separated from each other by a distance about twice the diameter of a projection at its base, said projections being provided to conduct heat from oil in said pan to said shell and said external fins, to agitate oil flowing over said projections and to permit substantially unchanneled flow of oil through said pan.

3. An improved oil pan comprising, in combination:

a cast aluminum half shell forming said pan,
said shell including an upper circumferential sealing surface for sealing engagement with an engine block when said pan is attached to said engine block, said pan including a deep dished portion having a bottom surface, said shell including a plurality of external separated fins integrally cast as part of said shell and extending outwardly therefrom to transfer heat to the surrounding atmosphere, and said shell including an array of integrally cast, frusto-conical projections extending upwardly from said bottom surface into the interior of said shell, said projections being provided to conduct heat from oil in said pan to said shell and said external fins, to agitate oil flowing over said projections and to permit substantially unchanneled flow of oil through said pan, said projections being positioned at the intersections of a grid of two parallel sets of lines intersecting at right angles whereby said projections form a rectangular array to insure unchanneled agitation of the oil and maximum heat transfer from the oil, through the projections and pan.

* * * * *